United States Patent

[11] 3,628,957

| [72] | Inventors | Simone Franco Casalgrasso; Manlio Marini, Savona, both of Italy |
|---|---|---|
| [21] | Appl. No. | 20,456 |
| [22] | Filed | Mar. 23, 1970 |
| [45] | Patented | Dec. 21, 1971 |
| [73] | Assignee | Ferrania, S.p.A. Milan, Italy |
| [32] | Priority | Mar. 22, 1966 |
| [33] | | Italy |
| [31] | | 31-888 |
| | | Continuation of application Ser. No. 615,923, Feb. 14, 1967, now abandoned. This application Mar. 23, 1970, Ser. No. 20,456 |

[54] GELATINO-SILVER HALIDE EMULSIONS CONTAINING WATER-SOLUBLE ACRYLAMIDE COPOLYMERS
9 Claims, No Drawings

| [52] | U.S. Cl. | 96/87 R, 96/114 |
|---|---|---|
| [51] | Int. Cl. | G03c 1/04 |
| [50] | Field of Search | 96/87, 114 |

[56] References Cited
UNITED STATES PATENTS

| 2,467,832 | 4/1949 | Jones | 260/80 |
|---|---|---|---|
| 3,271,158 | 9/1966 | Allentoff et al. | 96/114 |

FOREIGN PATENTS

| 945,857 | 1/1964 | Great Britain | 96/114 |
|---|---|---|---|

*Primary Examiner*—Ronald H. Smith
*Attorney*—Kinney, Alexander, Sell, Steldt & DeLaHunt

ABSTRACT: Silver halide gelatin emulsions useful in preparing photographic films having improved covering power using a water-soluble acrylamide copolymer in an amount from 2 to 75 weight percent, based on total weight of gelatin.

GELATINO-SILVER HALIDE EMULSIONS CONTAINING WATER-SOLUBLE ACRYLAMIDE COPOLYMERS

This is a continuation of application Ser. No. 615,923, filed Feb. 14, 1967, now abandoned.

The present invention relates to a process for the preparation of silver halide photographic emulsions having improved properties and to the resulting emulsions.

It is known that sensitometric properties of photographic emulsions can be improved by the addition of certain compounds, such as salts of heavy metals or noble metals. An improvement in the gamma and maximum density may also be accomplished be adding to the emulsion polyvinyl lactams containing four to five carbon atoms in the heterocyclic ring, e.g., polyvinyl piperidone or polyvinyl pyrrolidone, as described in French Pat. No. 1,234,882. Unfortunately the resulting photographic emulsions have a strong tendency to fog, though this can be minimized by including small quantities of a phenolic antifog agent in the emulsion along with the polyvinyl lactam (French Pat. No. 1,233,875). Even with such antifoggants, however, the emulsion properties may vary during storage under different conditions of temperature and relative humidity.

It is an object of this invention to provide silver halide photographic emulsions and photographic products prepared therefrom which have improved covering power of the developed silver, increased contrast and good sensitivity.

In accordance with this invention the above and other objects are achieved by including in a gelatin emulsion from 2 to 75 weight percent, based on gelatin weight, of a water soluble copolymer comprising acrylamide and at least one comonomer of the formula

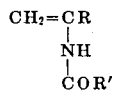

wherein R is hydrogen or alkyl and COR' is either an ester group (e.g., alkyl, aryl or aralkyl ester) or an amide group of the formula

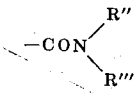

wherein R'' is hydrogen or alkyl and R''' is hydrogen, alkyl, aryl or aralkyl. Vinyl ureas (Bull Soc. Chim. Belg. 67, 123 [1958]) and vinyl carbamates (J. Poly. Sci. 35, 215 [1959]) are known. The molar ratio of the respective monomers must be selected so as to provide a water soluble copolymer but is otherwise not critical. The intrinsic viscosity of the acrylamide copolymer can range from 0.10 to 2 dl./g. (measured at 30° C. in 1 M $NaNO_3$), preferably from 0.10 to 0.60 dl./gram. Illustrative comonomers include methyl vinyl carbamate, ethyl vinyl carbamate, butyl vinyl carbamate, phenyl vinyl carbamate, benzyl vinyl carbamate, N-vinyl-N'-ethyl urea, N-vinyl-N'-phenyl urea, N-vinyl-N'-methyl-N'-phenyl urea, etc. Such acrylamide copolymers may be obtained in conventional manner by free radical polymerization with peroxides or azo derivatives, preferably in solution.

The partial replacement of gelatin in the silver halide gelatin emulsion with one or more of the above water soluble acrylamide copolymers produces an increase in the covering power of the silver formed after exposure and development. Stated in another manner, as compared to an emulsion layer containing only gelatin, the emulsion layers of this invention display a higher contrast and higher maximum density for the same silver content. This also permits a reduction in the silver content of the emulsion layer without adversely affecting the sensitometric properties. Another advantage resides in the ability to add these acrylamide copolymers as an aqueous solution to the gelatin emulsion without requiring serious modification of standard techniques, without producing solvent recovery problem, and without complicating the conventional coating and drying methods.

The modified gelatin emulsions of this invention are particularly useful in the preparation of emulsions for X-ray films, especially X-ray films for medical X-ray diagnosis, and in the preparation of emulsions for graphic art products. Their use is not limited to a particular type of emulsion or of silver halide, and they can be used in bromide, bromide-iodide, chlorobromide and chloride emulsions and in emulsions for color as well as black-and-white photography. Ingredients suggested for use in photographic emulsions may also be usefully included in the modified gelatin emulsions of this invention, such as noble metal compounds, ammonium aurocyanate, allyl thiourea, polyoxyethylene sensitizers, optical sensitizers, couplers, anitfoggants, stabilizers, plasticizers, hardeners, etc.

The following preparations and examples, yet not limitative, are of use to illustrate the above discussion.

PREPARATION 1

In a 1-liter flask, provided with stirrer and reflux condenser, 19.2 g. of acrylamide and 3 g. of methyl vinyl carbamate are dissolved in 420 ml. of a 3:1 acetone-methanol mixture by volume. The solution is refluxed for 5 minutes, 0.88 g. of azo-bis-isobutyronitrile is added, and the mixture is refluxed for 5 hours. After the flask is cooled in an ice bath, the polymer which has separated out as a white powder during the reaction is filtered off, washed with acetone and dried under vacuum. Yield of polymer: 20.5 g. [$\eta$]=0.56. N percent = 18.75.

PREPARATION 2

By following the procedure described in preparation 1, to a solution of 17 g. of acrylamide and 6 g. of methyl vinyl carbamate in 450 ml. of acetone-methanol, 0.92 g. of azo-bis-isobutyronitrile is added and the resulting mixture is heated for 5 hours. Yield of polymer: 21 g. [$\eta$]=0.51. N percent = 18.35.

PREPARATION 3

To a solution of 19.2 g. of acrylamide and 3.45 g. of ethyl vinyl carbamate in 430 ml. of acetone-methanol, 0.90 g. of azo-bis-isobutyronitrile is added and the resulting mixture is heated for 5 hours. Yield of polymer: 21 g. [$\eta$]=0.46. N percent = 18.70.

PREPARATION 4

To a solution of 17 g. of acrylamide and 6.9 g. of ethyl vinyl carbamate in 455 ml. of acetone-methanol, 0.95 g. of azo-bis-isobutyronitrile is added and the mixture is heated at reflux for 5 hours. Yield of polymer: 20.8 g. [$\eta$]=0.35. N percent = 18.00.

PREPARATION 5

To a solution of 32 g. of acrylamide and 8.1 g. of 1-phenyl-3-vinyl-urea in 800 ml. of acetone, methanol, 1.6 g. of azo-bis-isobutyronitrile is added and the mixture is heated at reflux for 5 hours. Yield of polymer: 36.4 g. [$\eta$]=0.32. N percent = 18.65.

The nitrogen content in the above examples was determined by the Kjeldahl method, after careful drying of the products. The copolymeric structure of the resulting polymers was defined by I.R. examination. The intrinsic viscosities [$\eta$] were determined in 1 M $NaNO_3$, at 30° C. and are expressed in dl./g.

EXAMPLE 1

A high sensitivity ammonia emulsion, consisting of a gelatin-silver iodobromide dispersion with about 2 mol percent of silver iodide and 98 mol percent of silver bromide, with an Ag/gelatin ratio of about 0.63, to be employed for X-ray elements with intensifying screens, containing the usual spreading agents, stabilizers, hardeners, etc., was divided in three portions.

The first portion was spread directly on a conventional cellulose triacetate film support to provide a dry coating thickness of about $12.3\mu$.

The second portion was mixed with the polymer of preparation 1, in such an amount as to provide a gelatin to polymer weight ratio of 100/25. This was then spread on a cellulose triacetate film support to provide a dry coating thickness of $12.7\mu$.

The third portion was mixed with the polymer of preparation 2, in such an amount as to provide a gelatin to polymer weight ratio of 100/25. This was then spread on a cellulose triacetate film support to provide a dry coating thickness of $12.8\mu$.

a. After ageing for 5 days at 50° C. and 65 percent relative humidity, the specimens were exposed under a wedge of constant 0.3 log E and were then processed for 2 hours and 30 minutes at 27° C. in a developing bath formulated as follows:

| | | |
|---|---|---|
| p-methylaminophenol sulfate (metol) | | 3 g. |
| anhydrous sodium sulfite | | 50 g. |
| hydroquinone | | 9 g. |
| anhydrous sodium carbonate | | 50 g. |
| potassium bromide | | 3 g. |
| glutaraldehyde bisulfite | | 13 g. |
| 5-methyl-benzotriazole | | 0.15 g. |
| water | to make | 1,000 ml. |

The three specimens, after being fixed, washed and dried in the conventional manner, exhibited the properties shown in table 1:

TABLE 1

| Specimen No. | Polymer of the preparation | Thickness, $\mu$ | Ag/sq.m., g.* | Fog | Sensitivity | $\gamma$ | $D_{max}$ |
|---|---|---|---|---|---|---|---|
| 1 | | 12.3 | 6.94 | 0.20 | +0.25 | 1.20 | 2.37 |
| 2 | 1 | 12.7 | 6.50 | 0.26 | +0.40 | 1.35 | 2.32 |
| 3 | 2 | 12.8 | 6.54 | 0.26 | +0.40 | 1.45 | 2.33 |

*On unexposed stock.

b. After shelf-ageing for 30 days the specimens were exposed under a wedge of constant 0.3 log E and were then processed for 4 minutes at 20° C., in a developing bath formulated as follows:

| | | |
|---|---|---|
| anhydrous sodium carbonate | | 50 g. |
| anhydrous sodium sulfite | | 50 g. |
| hydroquinone | | 9 g. |
| p-methylaminophenol sulfate (metol) | | 3 g. |
| potassium bromide | | 3 g. |
| water | to make | 1,000 ml. |

The three specimens, after being fixed, washed and dried in the conventional manner, exhibited the properties shown in table 2.

TABLE 2

| Specimen No. | Polymer of the preparation | Thickness, $\mu$ | Ag/sq.m., g.* | Fog | Sensitivity | $\gamma$ | $D_{max}$ |
|---|---|---|---|---|---|---|---|
| 1 | | 12.3 | 6.94 | 0.20 | 0 | 1.10 | 2.19 |
| 2 | 1 | 12.7 | 6.50 | 0.18 | +0.20 | 1.30 | 2.27 |
| 3 | 2 | 12.8 | 6.54 | 0.18 | +0.20 | 1.35 | 2.30 |

*On unexposed stock.

The sensitivities were determined at density 1 on the fog. For convenience of comparison, the reported numerical values are expressed as differences of log E, with respect to an arbitrarily selected reference mark of the exposure wedge. The positive values indicate a greater sensitivity.

EXAMPLE 2

An ammonia emulsion, similar to that of example 1, was divided in three portions.

The first portion was directly spread on a usual cellulose triacetate support so as to obtain a dry film having a thickness of about $12.3\mu$.

The second portion was mixed with the polymer of preparation 3 in a gelatin to polymer weight ratio of 100/25, and was then spread on a cellulose triacetate film support to provide a dry coating thickness of $11.6\mu$.

The third portion was mixed with the polymer of preparation 4 in a gelatin to polymer weight ratio of 100/25 and was then spread onto a cellulose triacetate film support to provide a dry coating thickness of $12.4\mu$.

a. After curing for 5 days at 50° C. and 65 percent humidity, the specimens were exposed and thereafter processed (as already described in example 1a). The resulting films had the properties shown in table 3:

TABLE 3

| Specimen No. | Polymer of the preparation | Thickness, $\mu$ | Ag/sq.m., g.* | Fog | Sensitivity | $\gamma$ | $D_{max}$ |
|---|---|---|---|---|---|---|---|
| 1 | | 12.3 | 6.94 | 0.20 | +0.25 | 1.20 | 2.37 |
| 2 | 3 | 11.6 | 5.19 | 0.25 | +0.30 | 1.25 | 2.20 |
| 3 | 4 | 12.4 | 5.40 | 0.24 | +0.40 | 1.40 | 2.26 |

*On unexposed stock.

b. After shelf-ageing for 30 days the specimens were exposed and thereafter processed in the manner described in example 1b. The resulting films had the properties shown in table 4:

TABLE 4

| Specimen No. | Polymer of the preparation | Thickness, $\mu$ | Ag/sq.m., g.* | Fog | Sensitivity | $\gamma$ | $D_{max}$ |
|---|---|---|---|---|---|---|---|
| 1 | | 12.3 | 6.94 | 0.22 | 0 | 1.10 | 2.19 |
| 2 | 3 | 11.6 | 5.19 | 0.17 | +0.15 | 1.30 | 2.22 |
| 3 | 4 | 12.4 | 5.40 | 0.17 | +0.15 | 1.30 | 2.28 |

*On unexposed stock.

EXAMPLE 3

An ammonia solution, similar to that described in example 1, was divided into two portions.

The first portion was spread directly onto a usual cellulose triacetate film support to provide a dry coating thickness of $13.1\mu$.

The second portion was mixed with the polymer of preparation 5, in a gelatin to polymer weight ratio of 100/25, and then spread onto the cellulose triacetate film support to provide a dry coating thickness of $13.9\mu$.

After shelf-ageing for 5 days at 50° C. and 65 percent relative humidity the specimens were exposed and thereafter processed in the manner described in example 1a. The resulting films had the properties shown in table 5.

TABLE 5

| Specimen No. | Polymer of the preparation | Thickness, $\mu$ | Ag/sq.m., g.* | Fog | Sensitivity | $\gamma$ | $D_{max}$ |
|---|---|---|---|---|---|---|---|
| 1 | | 13.1 | 6.83 | 0.18 | 0 | 0.95 | 2.10 |
| 2 | 5 | 13.9 | 5.86 | 0.18 | +0.05 | 1 | 2.05 |

*On unexposed stock.

What is claimed is:

1. A silver halide gelatin emulsion containing from 2 to 75 weight percent based on gelatin weight, of a water-soluble copolymer of acrylamide and at least one comonomer of the formula $$\begin{array}{c} CH_2=CR \\ | \\ NH \\ | \\ COR' \end{array}$$

wherein R is hydrogen or alkyl and COR' is an alkyl ester, an aryl ester or an aralkyl ester group or an amide group of the formula $$-CON\begin{array}{c} R'' \\ \diagdown \\ R''' \end{array}$$

in which R'' is hydrogen or alkyl and R''' is hydrogen, alkyl, aryl or aralkyl.

2. The silver halide gelatin emulsion of claim 1 in which said water-soluble acrylamide copolymer has an intrinsic viscosity from 0.10 to 2 dl./gram as measured at 30° C. in 1 M aqueous solution of $NaNO_3$.

3. A photographic film having a silver halide gelatin emulsion layer containing from 2 to 75 weight percent, based on gelatin weight, of a water-soluble copolymer of acrylamide and at least one comonomer of the formula $$\begin{array}{c} CH_2=CR \\ | \\ NH \\ | \\ COR' \end{array}$$

wherein R is hydrogen or alkyl and COR' is an alkyl ester, an aryl ester or an aralkyl ester group or an amide group of the formula $$CON\begin{array}{c} R'' \\ \diagdown \\ R''' \end{array}$$

in which R'' is hydrogen or alkyl and R''' is hydrogen, alkyl, aryl or aralkyl.

4. The photographic film of claim 3 in which said water-soluble acrylamide copolymer has an intrinsic viscosity from 0.10 to 2 dl./gram as measured at 30° C. in 1 M aqueous solution of $NaNO_3$.

5. The gelatin emulsion of claim 1 wherein said water-soluble copolymer is a copolymer of acrylamide and methyl vinyl carbamate.

6. The gelatin emulsion of claim 1 wherein said water-soluble copolymer is a copolymer of acrylamide and ethyl vinyl carbamate.

7. A silver halide gelatin emulsion containing from 2 to 75 weight percent based upon gelatin weight of a water-soluble copolymer of acrylamide and at least one comonomer of the formula $$\begin{array}{c} CH_2=CR \\ | \\ NH \\ | \\ CON \\ \diagdown \\ R''' \end{array} R''$$

wherein R is hydrogen or alkyl, R'' is hydrogen or alkyl, and R''' is hydrogen, alkyl, aryl, or aralkyl.

8. The gelatin emulsion of claim 7 wherein said water-soluble copolymer is a copolymer of acrylamide and 1-phenyl-3-vinyl-urea.

9. A photographic element having a layer comprising the silver halide gelatin emulsion of claim 7.

UNITED STATES PATENT OFFICE
CERTIFICATE OF CORRECTION

Patent No. 3,628,957     Dated December 21, 1971

Inventor(s) Simone Franco and Manlio Marini

It is certified that error appears in the above-identified patent and that said Letters Patent are hereby corrected as shown below:

Col. 1, line 12, "be" should read --by--;

Col. 2, line 43, after "heated", insert --at reflux--;

Col. 2, line 57, "acetone, methanol" should read --acetone-methanol--.

Signed and sealed this 6th day of June 1972.

(SEAL)
Attest:

EDWARD M. FLETCHER, JR.
Attesting Officer

ROBERT GOTTSCHALK
Commissioner of Patents